US010811856B2

(12) United States Patent
Symington et al.

(10) Patent No.: US 10,811,856 B2
(45) Date of Patent: Oct. 20, 2020

(54) SYSTEM FOR SERVICING CABLE

(71) Applicant: ULC ROBOTICS, INC., Hauppauge, NY (US)

(72) Inventors: Alex Symington, West Islap, NY (US); Hermann Herrlich, Lindenhurst, NY (US); George Lohr, Commack, NY (US); Robert Kodadek, Long Beach, NY (US)

(73) Assignees: ULC Robotics, Inc., Hauppauge, NY (US); Consolidated Edison Company of New York, New York, NY (US)

( * ) Notice: Subject to any disclaimer, the term of this patent is extended or adjusted under 35 U.S.C. 154(b) by 867 days.

(21) Appl. No.: 15/204,591

(22) Filed: Jul. 7, 2016

(65) Prior Publication Data

US 2017/0012412 A1   Jan. 12, 2017

Related U.S. Application Data

(60) Provisional application No. 62/190,050, filed on Jul. 8, 2015.

(51) Int. Cl.
*H02G 1/00* (2006.01)
*H02G 1/12* (2006.01)
(Continued)

(52) U.S. Cl.
CPC ........... *H02G 1/005* (2013.01); *H02G 1/1256* (2013.01); *H02G 1/1265* (2013.01); *H02G 1/14* (2013.01); *H02G 9/10* (2013.01); *H02G 15/043* (2013.01)

(58) Field of Classification Search
CPC ........ H02G 1/005; H02G 1/14; H02G 1/1256; H02G 1/1265
See application file for complete search history.

(56) References Cited

U.S. PATENT DOCUMENTS 3,168,845 A     2/1965  Kleiner et al.
4,512,828 A *   4/1985  Helm ................. H02G 1/14
                                                140/115

(Continued)

FOREIGN PATENT DOCUMENTS

DE    1190071 B    4/1965
EP    1231692 A1   8/2002
(Continued)

OTHER PUBLICATIONS

Office Action in EP App. No. 16178611.6 dated Feb. 19, 2018.
European Search Report in App. No. EP 16 17 8611 dated Nov. 8, 2016.

*Primary Examiner* — Livius R. Cazan
(74) *Attorney, Agent, or Firm* — Brooks Kushman P.C.

(57) ABSTRACT

A system for servicing cable includes a plurality of jaws operable between an open position for receiving a cable in a direction transverse to a cable axis such that the cable extends axially beyond the jaws in two directions, and a closed position for engaging and rotationally fixing the cable about the cable axis. A tool arrangement is disposed proximate to the base and includes at least one tool operable to perform work on the cable when the cable is engaged by the jaws. The tool arrangement is operable to perform at least one of a rotational movement around or an axial movement along the cable axis and to operate the tool.

6 Claims, 5 Drawing Sheets

(51) Int. Cl.
*H02G 1/14* (2006.01)
*H02G 9/10* (2006.01)
*H02G 15/04* (2006.01)

(56) References Cited

U.S. PATENT DOCUMENTS

| | | |
|---|---|---|
| 5,243,882 A | 9/1993 | Stepan |
| 5,487,220 A | 1/1996 | Saitou |
| 5,596,802 A | 1/1997 | Koch et al. |
| 7,597,030 B2 | 10/2009 | Stepan et al. |
| 8,632,284 B2 * | 1/2014 | Antonischki .......... H02G 1/005 409/132 |
| 2013/0047814 A1 | 2/2013 | Kehl et al. |
| 2013/0283605 A1 | 10/2013 | Furuhata |

FOREIGN PATENT DOCUMENTS

| | | |
|---|---|---|
| EP | 2871734 A1 | 5/2015 |
| FR | 2732522 A1 | 10/1996 |
| JP | 2010146896 A | 7/2010 |

* cited by examiner

SYSTEM FOR SERVICING CABLE

CROSS-REFERENCE TO RELATED APPLICATIONS

This application claims the benefit of U.S. provisional application Ser. No. 62/190,050 filed Jul. 8, 2015, the disclosure of which is hereby incorporated in its entirety by reference herein.

TECHNICAL FIELD

The present disclosure relates to a system and method for servicing cable.

BACKGROUND

Because of the high density of demand for electric power in urban areas, an underground distribution network system is commonly used. The distribution network system typically includes conduits under the street pavement with primary splicing structures—e.g., manholes—every 300 to 500 feet and secondary splicing structures—e.g., secondary boxes—every 100 to 150 feet. Distribution-network feeders operate at different voltages; for example, in some applications, 13 kilovolt (kV) and 27 kV feeders are commonly used. The distribution-network feeders consist of three cables which are A, B, and C phase. These feeders are installed in conduits to transport electricity from the supply substation to several distribution-network transformers. Unlike overhead open-wire feeders, where larger clearances are available to allow safe live-line work, underground cable feeders may need to be de-energized in order to perform work. Because of the multipath characteristics of a network system, a feeder outage may not be immediately reflected in customer outages, but instead, may result in added stress to the components remaining in service and lower supply voltage to customers.

A live end-cap (LEC) is a splice that is often used during adverse system conditions to expedite feeder restoration. An LEC process includes separating a cable connection and insulating part of it to allow the selected portion of the feeder to be re-energized. Once an LEC is installed, a smaller, less critical portion of the feeder is dropped, and the rest of the feeder is energized back into service. Installing an LEC may be simpler and quicker than performing a complete repair in the midst of an outage. Despite advances in the process for installing LEC's, a need exists for a system and method of servicing a cable—for example, to install a live end-cap or splice one or more cable sections together to create a single conductive path—that utilizes one or more machines to perform tasks that would otherwise need to be performed manually by technicians, and which may provide an automated or semi-automated system and process to improve the installation tasks.

SUMMARY

Embodiments described herein include a system for servicing cable. The system includes a base including a plurality of jaws operable between an open position for receiving a cable and a closed position for engaging the cable such that the cable is rotationally fixed. The jaws have a first side and a second side and include an aperture disposed axially therethrough from the first side to the second side such that the cable extends through the aperture and axially beyond the first side and the second side when the jaws are closed and engage the cable. A tool arrangement is axially disposed proximate to the base and includes at least one tool. The tool arrangement is operable to perform at least one of a rotational movement around or an axially movement along an outside of the cable when the cable is engaged by the jaws. The tool arrangement is further operable to operate the tool to perform work on the cable.

Embodiments described herein include a system for servicing cable. The system includes a base including a plurality of jaws operable between an open position for receiving a cable in a direction transverse to a cable axis such that the cable extends axially beyond the jaws in two directions, and a closed position for engaging and rotationally fixing the cable about the cable axis. A tool arrangement is disposed proximate to the base and includes at least one tool operable to perform work on the cable when the cable is engaged by the jaws. The tool arrangement is operable to perform at least one of a rotational movement around or an axial movement along the cable axis and to operate the tool.

Embodiments described herein include a method for servicing cable that includes opening at least one jaw of a plurality of jaws on a base, and receiving a cable into the jaws in a direction transverse to a cable axis such that the cable extends axially beyond the jaws in two directions. The at least one jaw is closed on the cable such that the cable is rotationally fixed about the cable axis, and a tool arrangement is operated to perform at least one of a rotational movement around or an axial movement along an outside of the cable and to perform work on the cable.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
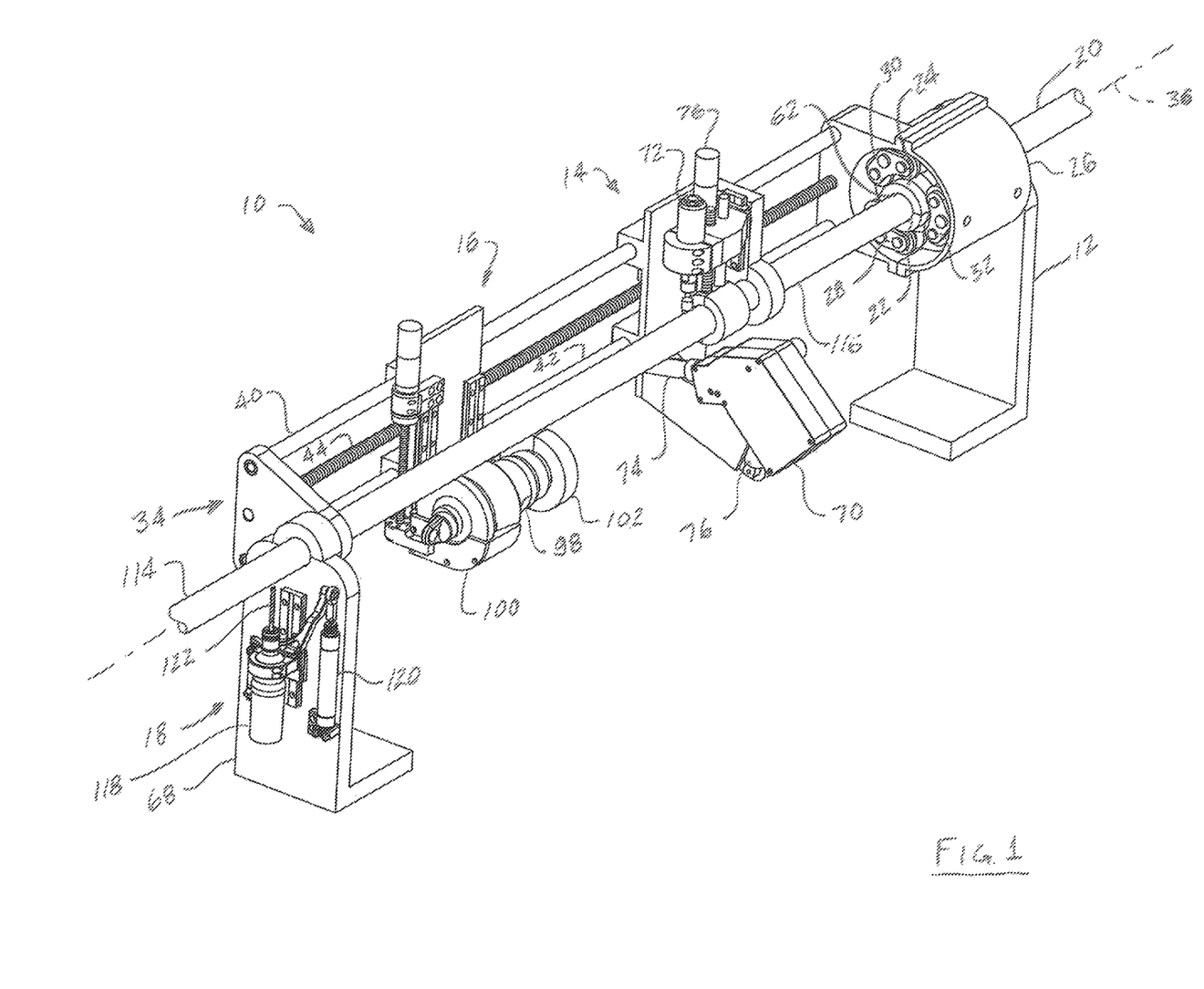
FIG. 1 is a perspective view of a system for servicing cable in accordance with embodiments described herein.

FIG. 1 shows a system 10 for servicing the cable in accordance with embodiments described herein. The system 10 includes a base 12, a first tool arrangement 14 axially disposed proximate to the base 12, an end-cap installer 16, and a second tool arrangement 18 disposed axially relative to the first tool arrangement 14 and the end-cap installer 16. Also shown in FIG. 1 is a portion of an electrical cable 20 that is disposed within the system 10, and more particularly is engaged by two jaws 22, 24 of the base 12, shown in their closed position. The jaws 22, 24 are also shown in the partially exploded view of FIG. 2, but they are shown in their open position ready to receive the electrical cable 20. The orientation of the system 10 in FIG. 2 is reversed from the orientation shown in FIG. 1—for example, the base 12 is now toward a left side of the drawing figure and the position of the first and second tool arrangements 14, 18 is also reversed.

Figure 2:
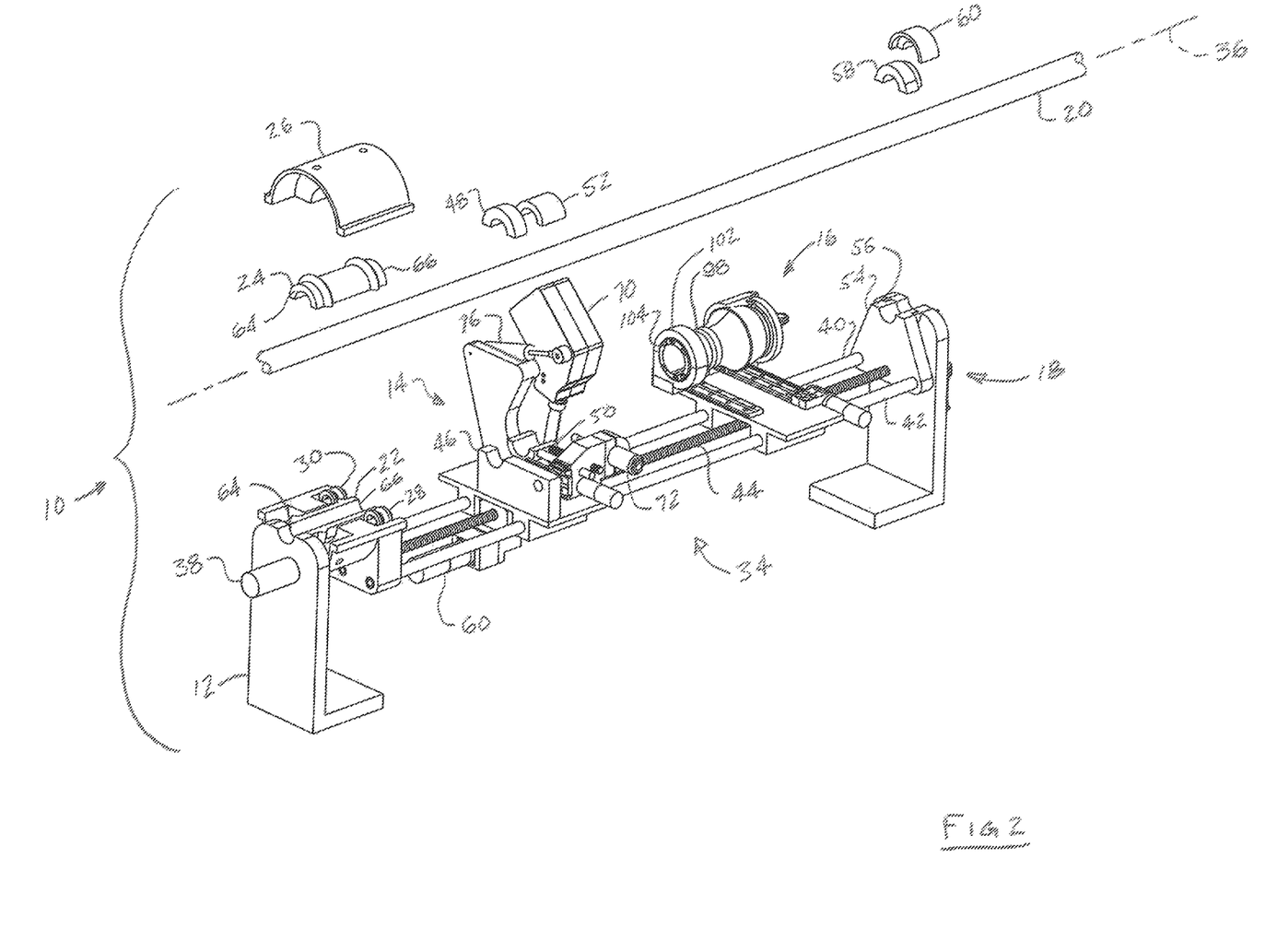
FIG. 2 is a partially exploded view of the system shown in FIG. 1.

As shown in FIGS. 1 and 2, a cap 26 covers the jaws 22, 24 of the base 12 and holds in place a number of sets of rollers 28, 30, 32 that ride on the jaws 22, 24 as the drive assembly 34 rotates about an axis 36 of the cable 20. A motor 38—see FIG. 2—attached to the base 12 is operable to rotate the drive assembly 34, including the first tool arrangement 14 and the end-cap installer 16, around the axis 36 of the cable 20. As shown in FIG. 1, the drive assembly 34 is oriented with slides 40, 42 and drive screw 44 oriented vertically relative to each other. In contrast, the entire drive assembly 34 has been rotated approximately 90° as shown in FIG. 2 and the slides 40, 42 and the drive screw 44 are oriented horizontally relative to each other. The motor 38 is operable to rotate the drive assembly 34 continuously around the cable axis 36, which allows work to be performed on the cable 20 without the need to rotate it. This arrangement may be particularly desirable when working on an electrical cable that is attached at both ends to devices, junction boxes, other cables, etc.

This is one of the advantages of embodiments such as the system 10, which allow work to be performed—for example, cutting the cable, preparing the cut cable-end, and installing an end cap—while the cable has both of its ends connected to other equipment. More particularly, as shown in FIG. 2, the system 10 is configured to receive the cable 20 in a direction that is transverse to the cable axis 36. It is not necessary therefore to feed a cable endwise into the system 10—which would only be possible if the cable had a readily available cut end—rather, the system 10 can receive an electrical cable transversely as shown in FIG. 2.

In addition to the jaws 22, 24 of the base 12, the first tool arrangement 14 also includes jaws 46, 48 and 50, 52, and an end portion 54 of the drive assembly 34 includes jaws 56, 58, which are covered by a cap 60. Unlike the jaws 22, 24 of the base 12, the jaws 46, 48, 50, 52 of the first tool arrangement 14, and the jaws 56, 58 of the end portion 54, do not engage the cable 20 tightly. Rather, the jaws 46, 48, 50, 52 provide support for work to be performed on the cable 20 by the first tool arrangement 14, and the jaws 56, 58 of the end portion 54, provide support for work to be performed on the cable 20 by the second tool arrangement 18. In contrast, the jaws 22, 24 of the base 12 do engage the cable 20 tightly so as to allow the various operations described herein to be performed on the cable while it is securely positioned in the system 10.

As described above, the first tool arrangement 14 is configured to perform a rotational movement around the cable 20—in this embodiment as a result of the rotation of the entire drive assembly 34—but it is also configured to perform axial movement along an outside of the cable 20, which further facilitates it performing work on the cable 20. In other embodiments, a tool arrangement, such as the first tool arrangement 14, may be configured to perform only one of these movements—i.e., rotational or axial-relative to a cable engaged in the system. As shown in FIG. 2, a drive motor 60 is attached to the first tool arrangement 14 and facilitates movement of the first tool arrangement 14 along the drive screw 44 and the slides 40, 42. Although not visible in FIG. 2, it is understood that a similar motor arrangement is provided for the end-cap installer 16.

As described above, embodiments described herein, and in particular the system 10, allow a cable such as the cable 20 to be inserted transversely rather than axially. Therefore, when installed, the cable 20 will extend through an aperture 62—see FIG. 1—disposed axially through the jaws 22, 24 and beyond a first side 64 and a second side 66 of the jaws 22, 24. In fact, as shown in FIG. 1, the cable 20 extends axially in both directions beyond the base 12 on one side and a support 68 to which the second tool arrangement 18 is mounted.

One of the advantages of embodiments described herein, including the system 10, is that work can be performed on an electrical cable remotely so that a technician or operator does not need to be directly in contact with or even in close proximity to the cable as work is being performed on it. This may be particularly advantageous in underground electrical networks, where there is a very high density of energized electrical cables. In particular, the various motors and actuators associated with the system 10 can easily be connected to an electrical controller or controllers, which can then be managed remotely from the system 10. Although the system 10 can perform a variety of work on an electrical cable, such as the cable 20, the configuration of the system 10 conveniently allows the cable 20 to be cut and an end cap installed.

In the embodiment shown in FIG. 1, the tool arrangement 14 includes a number of tools, and in particular a cutting tool 70 and a grinding tool 72. The cutting tool 70 utilizes a reciprocating blade 74 to cut the cable 20 at a desired axial position. A pneumatic cylinder 76—also shown in FIG. 2—is available to move the blade 74 radially into the cable 20. When the system 10 is used to install an end cap on the end of the cable, such as the cable 20, the cutting tool 70 will be used to make at least one cut in the cable. In some cases, a second cut may be made so that a section of the cable is removed, which may allow greater access for the tools and an end-cap installer, such as the end-cap installer 16.

Figure 3:
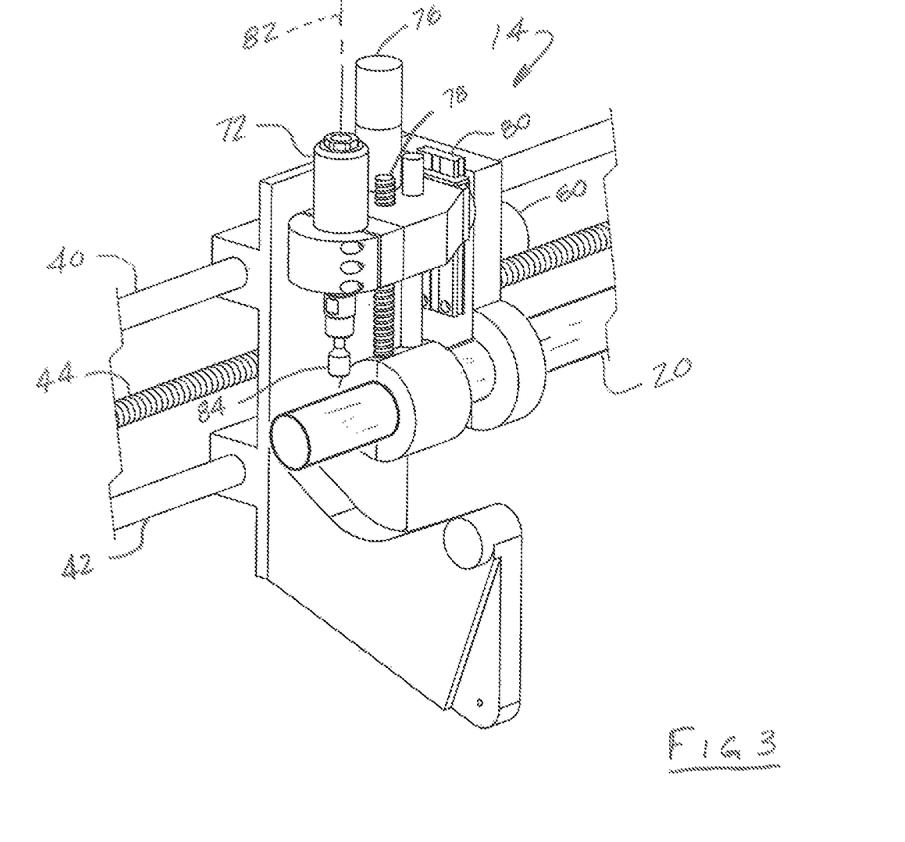
FIG. 3 is a perspective view of a tool arrangement that is part of the system shown in FIG. 1.

FIG. 3 shows the cable 20 after a section has been cut away and it is being worked-on by the grinding tool 72. As described above, the tool arrangement 14 can not only rotate around the cable 20 and move axially relative to it, but it can also operate to move radially toward and away from the cable 20. As shown in FIG. 3, the tool arrangement 14 includes a drive motor 76 which is operable to move the grinding tool 72 along a drive screw 78 and a slide 80. Stripping away the various layers of a cable, such as the cable 20, may be performed by any number of different types of tools; however, using a grinding tool, such as the grinding tool 72, may provide advantages over other types of tools. In particular, certain types of electrical cable end caps are configured to receive a tapered cable end, and grinding the end may be a relatively fast and efficient way to achieve the desired taper. The grinding tool 72 is configured to rotate about a tool axis 82 to allow a burr 84 to engage the cable 20 and cut through various layers.

Figure 4:
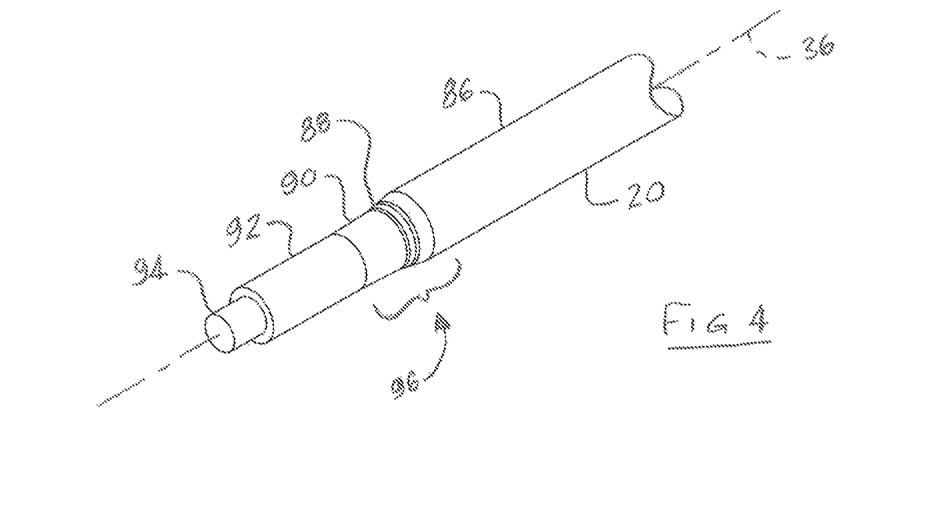
FIG. 4 is a perspective view of an electrical cable after it has had work performed on it by the tool arrangement shown in FIG. 3.

FIG. 4 shows the cable 20 after it has been tapered by the grinding tool 72. The outermost portion of the cable 20 is covered by a jacket 86. Beneath the jacket 86 are neutral conductors 88, often referred to as "neutral straps" because they are made from individual, flat pieces of conducting material, such as aluminum. Beneath the neutral straps 88 is an insulation shield 90, which covers the cable insulation 92. At the core, covered by the insulation 92, is a conductor 94. Although different types of electrical cables may have different types of conductor and insulation arrangements, it is contemplated that a grinding tool, such as the grinding tool 72, can be used to provide a desired taper for tasks such as installing an end cap. As shown in FIG. 4, the cable 20 includes an axial taper 96 over at least a portion of its length after it has been worked-on by the grinding tool 72. As an alternative to a taper, a grinding tool, such as the grinding tool 72, may be used to prepare a cable by grinding away layers of the cable to create a series of increasingly deeper straight sections, so that the cable end narrows in a stepwise fashion, rather than along a smooth taper. This type of cable end is described in more detail below in conjunction with another type of tool—see FIGS. 7 and 8 and their accompanying description.

Once the end of the cable 20 has been prepared, such as shown in FIG. 4, an end cap may then be installed. In FIGS. 1 and 2, an end cap 98 is shown already placed in the end-cap installer 16. More particularly, the end cap 98 is positioned in a cradle 100 of the end-cap installer 16. In situations where it is desirable to perform the installation operation remotely, a technician can place an end cap in the cradle 100 at the same time that the cable 20 is being placed into the various jaws of the system 10. In addition to the cradle 100, the end-cap installer 16 also includes an extraction arrangement 102. The extraction arrangement 102 is configured to extract a core from the end cap after the end cap has been installed on the end of a prepared cable. As shown in FIG. 2, the extraction arrangement 102 is engaged with a lip 104, which forms part of a core 105—see FIG. 5—of the endcap 98.

As described above, the end-cap installer 16—including both the cradle 100 and the extraction arrangement 102—is operable to move axially along the slides 40, 42 and the drive screw 44. The cradle 100 is also operable to move radially with respect to the cable 20 by operation of a drive motor 106, which moves the cradle 100 along a drive screw 108 and slides 110, 112. This allows the end-cap installer 16 to position the end cap 98 along the axis 36 of the cable 20 after the cable 20 has been cut and its end prepared as shown in FIG. 4. Once the endcap 98 is positioned along the axis 36 of the cable 20, the end-cap installer 16 can be moved axially so that the end cap 98 covers the prepared end of the cable 20—see FIG. 5.

Figure 5:
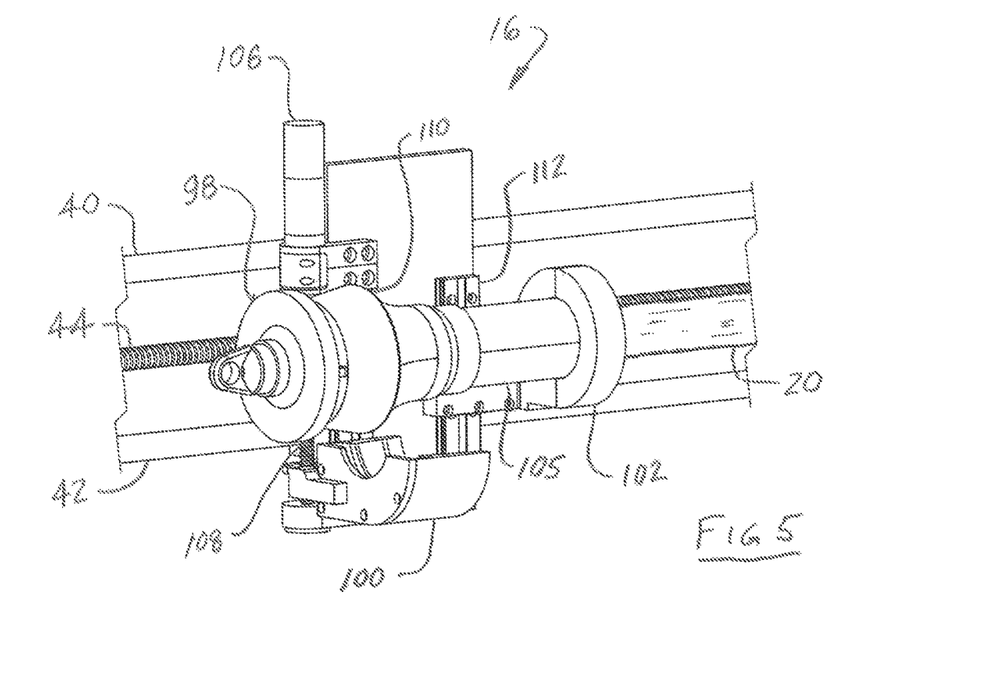
FIG. 5 is a perspective view of an end-cap installer that is part of the system shown in FIG. 1.

After the endcap 98 is positioned over the end of the cable 20, the cradle 100 is moved radially away from the endcap 98 so that the core 105 can be removed by the extraction arrangement 102. As shown in FIG. 5, once the cradle 100 has been moved away from the endcap 98, the entire end-cap installer 16 can be moved axially so that the extraction arrangement also moves axially and the core 105 is extracted from the endcap 98. Once the core 105 is extracted, the endcap 98 is securely engaged with the cable 20. Although the system 10 is illustrated and described in conjunction with installation of an end cap, embodiments, including the system 10, may perform other operations—i.e., other types of cable servicing. Just as one example, the system 10 may also be used for splicing one or more cable sections together to create a single conductive path.

As described above in conjunction with FIGS. 1 and 2, the system 10 also includes a second tool arrangement 18. The tool arrangement 18 is configured to act on the portion of the cable 20 that is opposite the portion where the end cap 98 is installed. As shown in FIG. 1, the cable 20 may be cut, for example, at the location where the cutting tool 70 is positioned. This leaves a portion 114 of the cable 20 electrically disconnected from a portion 116 of the cable 20 that will receive the end cap 98. In order to make sure that the portion 114 of the cable 20 is not mistakenly energized, it may be desirable to create a short circuit in this portion of the cable. That way if an attempt is made to connect the portion 114 of the cable 20 to a power source, the circuit will fail and the power source will not be connected to a cut end of an electrical cable. As described below, the step of creating the short circuit may be done as one of the first steps—i.e., before the cable is cut and an end cap installed.

The tool arrangement 18 is specifically configured to achieve this short circuit by connecting the core conductor 94 of the cable 20 to the neutral conductor 88. In the embodiment shown in FIG. 1, the second tool arrangement 18 includes a drill 118. In other embodiments, different tools may be employed by the second tool arrangement 18 to achieve the desired short circuit. The drill 118 is attached to a pneumatic cylinder 120 that is operable to move the drill 118 radially with respect to the cable 20. In this embodiment, the cutting tool 122 is a combination drill and tap that allows the tool 122 to penetrate through all of the layers of the cable 20 and then remain firmly fixed because of the threads on the tap portion of the tool 122.

Figure 6:
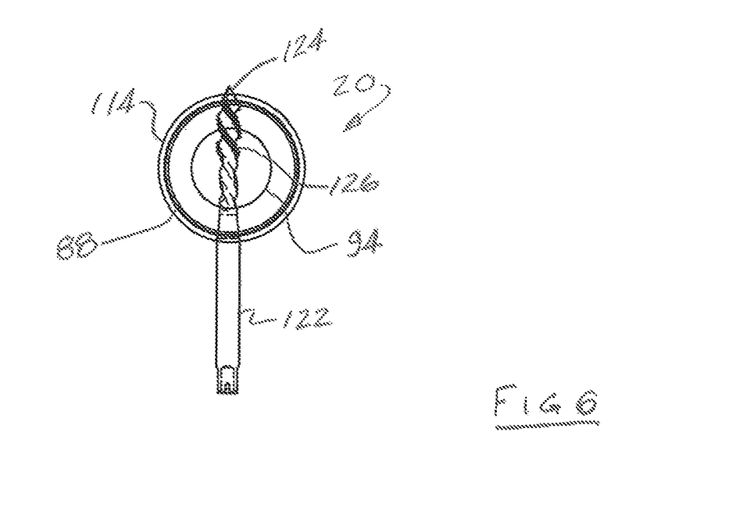
FIG. 6 is an end view of an electrical cable having a fastener disposed therethrough as part of the work performed by the system shown in FIG. 1.

This is illustrated in FIG. 6 where the cutting tool 122 has penetrated the cable 20 with a drill portion 124 while a threaded portion 126 has firmly engaged the cable 20. Because the cutting tool 122 is made from a conductive material such as high-speed steel, the core conductor 94 and the neutral conductor 88 are electrically connected and at least the portion 114 of the cable 20 is shorted. In other embodiments, a separate fastener may be installed through the cable after the drilling operation is complete. In yet other embodiments, a fastener may not be used and instead the portion 114 of the cable 20 may be fitted with a different type of end cap so that the neutral and hot conductors are connected.

Figure 7:
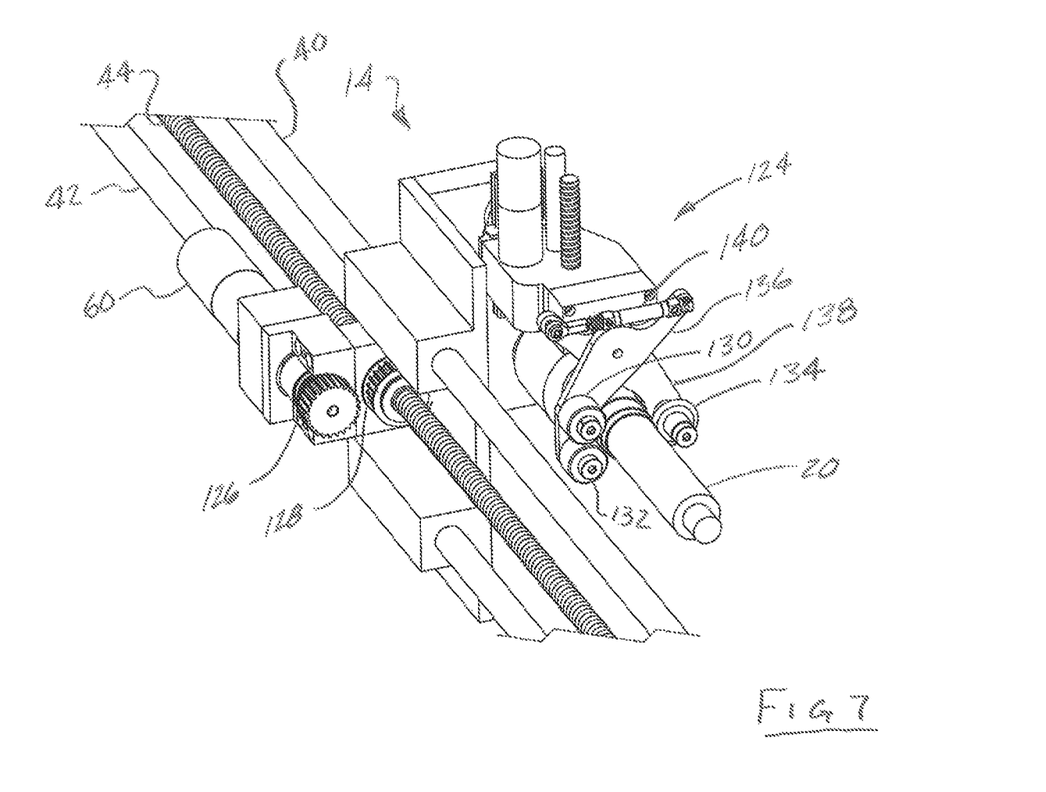
FIG. 7 is a perspective view of the tool arrangement shown in FIG. 3 with a different tool installed performing work on an electrical cable.

In the embodiment illustrated and described above, the tool arrangement 14 included a cutting tool 70 and a grinding tool 72. As an alternative to a grinding tool 72, the tool arrangement 14 may include a different type of tool to prepare the cable 20. This is illustrated in FIG. 7, which shows the tool arrangement 14 having a cutting tool 124 attached to it in place of the grinding tool 72. Also shown in FIG. 7 is the drive motor 60, which is used to move the tool arrangement 14 axially along the slides 40, 42 and the drive screw 44. A portion of this drive system is also shown in FIG. 7, including toothed pulleys 126, 128. In practice a timing belt may be connected between the pulleys 126, 128, but it has been removed for clarity. Thus, when the motor 60 is operated the pulley 126 rotates and drives a timing belt (not shown), which in turn rotates the pulley 128 and moves the tool arrangement 14 axially along the system 10.

Figure 8:
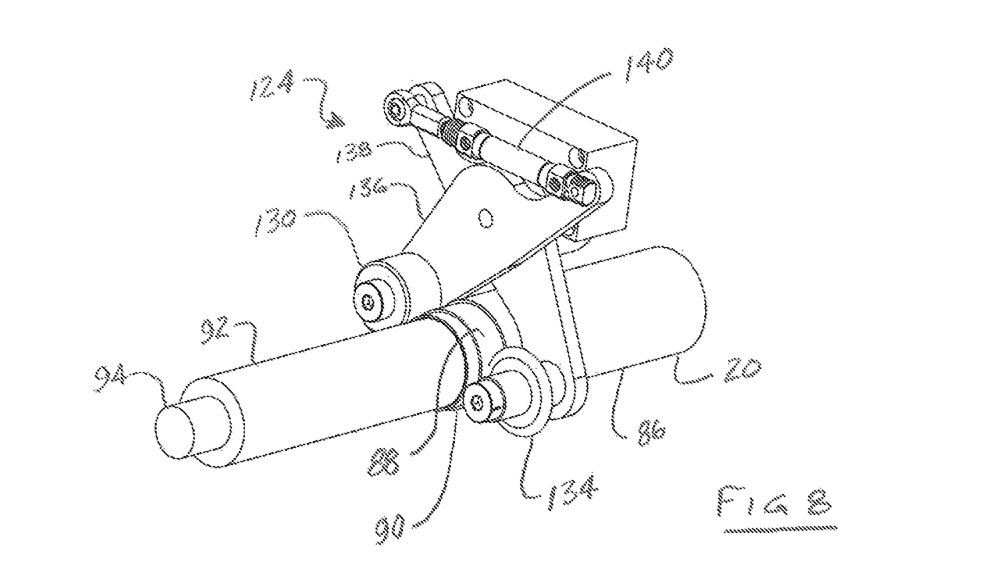
FIG. 8 a perspective view of the tool shown in FIG. 7 as it performs work on the electrical cable.

The cutting tool 124 includes a pair of rollers 130, 132 which engage the cable 20 while a cutting wheel 134 cuts into the various layers of the cable 20. The rollers 130, 132 are attached to a first arm 136 of the tool 124, while the cutting wheel 134 is attached to a second arm 138. The two arms are brought together and force applied to the cable 20 through the action of a pneumatic cylinder 140. Using a cutting tool, such as the tool 124, may be desirable when the end of the cable 20 is to be prepared in a stepwise fashion, rather than with a smooth taper as described above. FIG. 8 shows the cable 20 with various layers cut by the cutting wheel 134 in a stepwise fashion.

Because the drive motor 60 moves the tool arrangement 14 and the cutting tool 124 axially relative to the cable 20, and because the pneumatic cylinder 140 and the arms 136, 138 move the cutting wheel 134 radially into the cable 120, the cutting tool 124 can be used to cut the cable at predetermined axial positions and predetermined depths. Another advantage to the cutting tool 124 is that the rollers 130, 132 engage the neutral flat straps 88 when the outer jacket 86 of the cable 20 has been stripped away. This may be particularly helpful to keep the neutral flat straps 88 compressed against the inner layers of the cable. Once an outer jacket, such as the jacket 86, is removed from outside of a band of neutral flat straps in a cable, it is not uncommon for them to move away from the inner layers of the cable, which may be inconvenient as the flat straps can interfere with placement of an end cap over the end of the cable.

Although a method of operating a system, such as the system 10, to service a cable may be performed with various steps in various different orders, in at least some embodiments the following steps may be employed. Using the system 10 and its components for reference, the jaws 24, 48, 52, 58 and the caps 26, 60 may be removed so that the cable 20 can be inserted into the system 10 transversely relative to its axis 36. Although not shown in the drawing figures, the jaws may be hinged, bolted or otherwise connected to their mating jaws by any means that is effective to achieve the desired engagement. For an uncut piece of electrical cable that is attached at both ends to other devices, the cable 20 will extend axially in both directions beyond the ends of the system 10. The jaws 24, 48, 52, 58 and the caps 26, 60 will then be closed and the cable 20 will be rotationally fixed about its axis 36 by the jaws 22, 24.

Although described above after the description of other tool processes, it may be convenient to start by using the tool arrangement 18 to short-circuit the cable 20. After creating the short circuit, which may be positioned for visual inspection and confirmation by an operator, the cable 20 may then be cut by the cutting tool 70. For convenience, the cutting tool 70 may be moved axially along a length of the cable to make a second cut through the cable, thereby opening up a position for the end cap 98 to be moved into place. The cut end of the portion 116 of the cable 20 can then be prepared to receive the end cap 98. As described above, this can include using the grinding tool 72 to grind the end of the cable 20 to a desired taper, or it may include cutting the cable 20 in a stepwise fashion using cutting tool 124. Once the end of the cable 20 is prepared, the end cap 98 can be placed over the cable and the core 106 removed. This leaves the end cap 98 securely fastened to the cable 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for servicing cable, comprising:
 a base including a plurality of jaws operable between an open position for receiving a cable and a closed position for engaging the cable such that the cable is rotationally fixed, the jaws having a first side and a second side and including an aperture disposed axially therethrough from the first side to the second side such that the cable extends through the aperture and axially beyond the first side and the second side when the jaws are closed and engage the cable;
 a tool arrangement axially disposed proximate to the base and including at least one tool, the tool arrangement being operable to perform at least one of a rotational movement around or an axially movement along an outside of the cable when the cable is engaged by the jaws, and further operable to operate the tool to perform work on the cable; and
 an end-cap installer disposed axially relative to the tool arrangement and including a cradle configured to hold an end-cap therein, the end-cap installer being operable to move the cradle radially relative to the cable to bring the end-cap into axial alignment with the cable, and to move the cradle axially such that the end-cap covers an end of the cable, when the cable is engaged by the jaws, the end-cap installer further including an extraction arrangement operable to move axially and extract a core from the end-cap when the end-cap is covering an end of the cable.

2. The system of claim 1, wherein the tool arrangement is operable to rotate around and move axially along the outside of the cable, the tool arrangement being further operable to move radially toward and away from the cable, when the cable is engaged by the jaws.

3. The system of claim 2, wherein the at least one tool includes a grinding tool rotatable around a tool axis, the tool arrangement being operable to operate the grinding tool to grind the cable when the cable is engaged by the jaws.

4. The system of claim 3, wherein the at least one tool includes a cutting tool having a cutting wheel and at least one roller, the tool arrangement being configured to engage the cutting wheel with the cable when the cable is engaged by the jaws to cut through a cable jacket and to engage the at least one roller with a neutral conductor under the cable jacket such that the neutral conductor is compressed against a portion of the cable.

5. The system of claim 1, wherein the at least one tool includes a cutting tool and the tool arrangement is operable to engage the cutting tool with the cable when the cable is engaged by the jaws to cut through the cable at a desired axial position.

6. The system of claim 1, wherein the tool arrangement is a first tool arrangement, the system further comprising a second tool arrangement disposed axially relative to the first tool arrangement and operable to position a conducting element to be simultaneously in contact with two conductors of the cable when the cable is engaged by the jaws to create a short circuit between the two conductors.

* * * * *

UNITED STATES PATENT AND TRADEMARK OFFICE
CERTIFICATE OF CORRECTION

PATENT NO. : 10,811,856 B2
APPLICATION NO. : 15/204591
DATED : October 20, 2020
INVENTOR(S) : Symington et al.

It is certified that error appears in the above-identified patent and that said Letters Patent is hereby corrected as shown below:

On the Title Page

Item (72), add:
Patrick McHugh, Seaford, NY (US);
Maggie Chow, Hartsdale, NY (US);
George Murray, Glen Cove, NY (US);
Luis Jerez, White Plains, NY (US);
Michael Baratta, Jackson, NJ (US);
Thomas Campbell, Garrison, NY (US)

Signed and Sealed this
Thirty-first Day of May, 2022

Katherine Kelly Vidal
*Director of the United States Patent and Trademark Office*